C. B. SCHOENMEHL.
GALVANIC BATTERY.
APPLICATION FILED APR. 23, 1912.
1,055,561.
Patented Mar. 11, 1913.
2 SHEETS—SHEET 1.
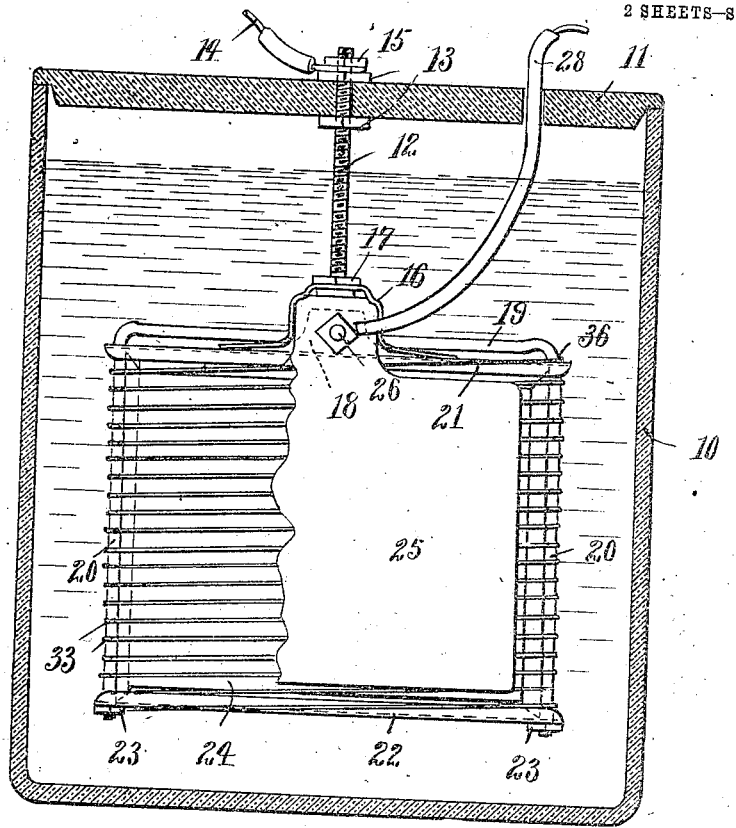
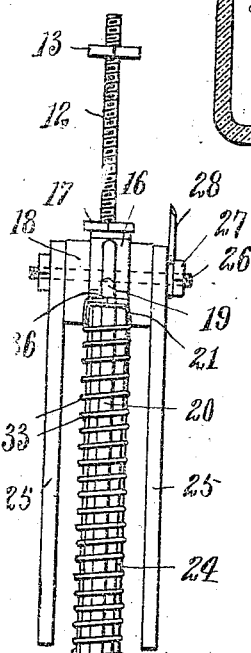
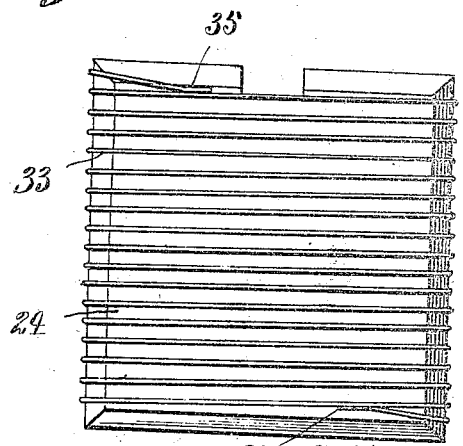
Witnesses
Inventor
Charles B. Schoenmehl
By Chamberlain & Newman
Attorneys

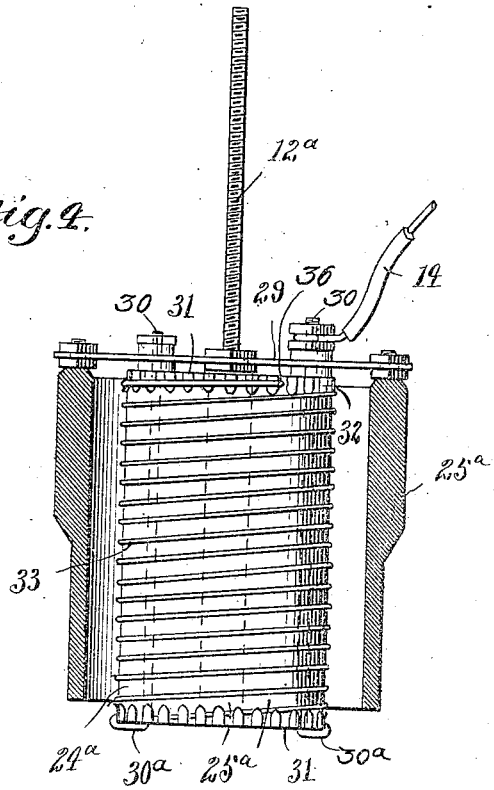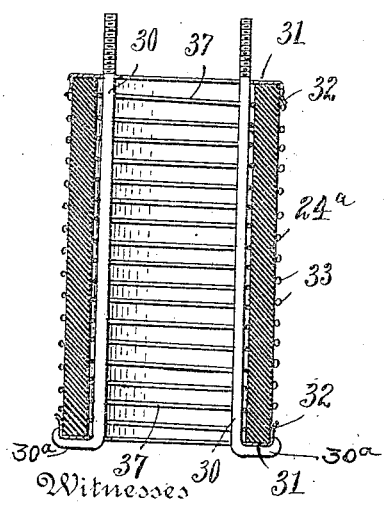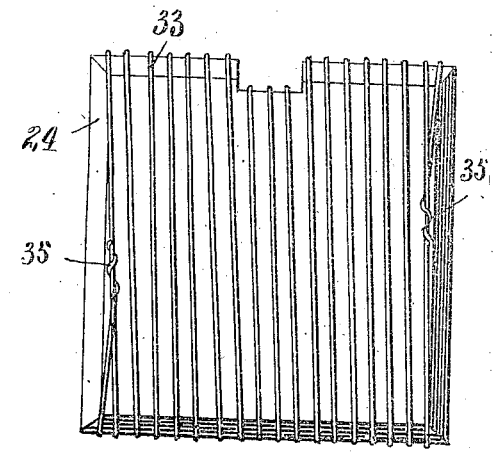

ated in the usual manner by lines and

UNITED STATES PATENT OFFICE.

CHARLES B. SCHOENMEHL, OF WATERBURY, CONNECTICUT.

GALVANIC BATTERY.

1,055,561.  Specification of Letters Patent.  Patented Mar. 11, 1913.

Application filed April 23, 1912. Serial No. 692,738.

*To all whom it may concern:*

Be it known that I, CHARLES B. SCHOEN-MEHL, citizen of the United States, and resident of Waterbury, in the county of New Haven and State of Connecticut, have invented certain new and useful Improvements in Galvanic Batteries, of which the following is a specification.

My invention relates to primary batteries, and more particularly to compressed oxid of copper negative electrodes therefor, and refers to the same irrespective of form, being equally applicable to the several types of compressed copper oxid plates, cylinders and piles. These types of negative electrodes are formed from finely ground oxid of copper scale which is pressed into form and baked to harden the same, and are then assembled with the co-acting positive or zinc electrodes, and suspended within a jar filled with a proper active solution which in practice affects the materials of the two electrodes. These compressed copper oxid negative electrodes swell, disintegrate, crumble and flake, more or less, in the operation of the battery, which, in some instances, renders them objectionable. It is also true that these electrodes are also brittle and more or less liable to break during handling and shipment, which obviously makes them useless when employed in the old way, without suitable protecting means to hold them in shape.

It is therefore the purpose of my invention to overcome the foregoing difficulties by providing means for more rigidly supporting the negative electrodes within their frames or hangers, and especially to protect their vertical operative sides or faces in a way which will properly retain them in form, even though they should become cracked or broken, and to accomplish the above in a manner which will leave practically all of the operative face of the electrode exposed to the solution and co-acting elements; to accomplish the foregoing in a simple, practical and inexpensive way, so that the efficiency of the element will in no way be impaired, but, on the other hand, so that the electrical connection or contact between the said elements and their supporting frame will be materially improved, thereby insuring a greater efficiency, causing the battery to produce a higher E. M. F. than is possible to produce with the old way of employing compressed negative elements.

It has also been the custom heretofore to preliminarily reduce the surface of these copper oxid negative electrodes, so that when applied in use they will operate at their full capacity at the beginning of an operation of the battery of which they form a part. I also, therefore, provide means for avoiding the necessity of preliminarily reducing the surface of these copper oxid negative elements to a metallic state, prior to being used, which consists in forming the supporting means in such a way and of a suitable material, whereby a plain black uncoated compressed copper oxid electrode may be used and made to produce a satisfactory initial and continual operation.

To these ends the invention resides and consists in means for carrying out the above objects, embodying the features of construction, combination of elements, having the general mode of operations substantially as hereinafter described and claimed in the specification and claims and shown in the accompanying drawings, and in which—

Figure 1 shows a central vertical sectional elevation through a modern type of primary battery, the suspended negative electrode of which is protected in accordance with my invention; Fig. 2 is a detached edge view of the assembled electrodes, shown in Fig. 1; Fig. 3 is a detached side view of a slightly different form of compressed oxid of copper plate from that shown in Fig. 1; Fig. 4 shows a cylindrical form of assembled element and includes an inner and outer zinc electrode and an intermediate cylindrical form of compressed copper oxid negative electrode; Fig. 5 is a central vertical sectional view of the cylindrical negative electrode shown in Fig. 4; and Fig. 6 is a further side elevation of a compressed oxid of copper negative electrode like that shown in Fig. 3, with the protecting means therefor arranged in a slightly different manner.

Referring in detail to the characters of reference marked upon the drawings, 10 represents a battery jar and 11 a cover therefor, the solution contained therein being indicated in the usual manner by lines and dashes. The assembled element, shown in Figs. 1 and 2, is hung from the cover through the medium of a suspending rod 12 passing through a hole in the cover and secured thereto by means of nuts 13. 14 represents a connecting wire attached to the said rod 12 by means of a nut 15 and designed to connect with the negative pole of the battery. To the lower end of the rod 12 is connected a flexible steel strip 16 by means of nuts 17, the central portion of said strip being struck up to fit over an insulating block 18 and punched out on either side to allow the top cross member 19 of the wire frame 20 to pass therethrough in engagement with a suitable recess in the before mentioned insulating block. A top channel cross piece 21, having a hole through each end portion, is fitted against the yieldable ends of the steel strip 16 and upon the vertical side portions of the frame 20. A somewhat similar sheet metal channel strip 22 is fitted to the lower end portions of the side members of the frame 20 and is secured thereon by means of nuts 23. The compressed oxid of copper negative element 24, which, in this instance, is in a plate form, is supported intermediate of the top and bottom sheet metal channel pieces 20 and 22 and the vertical side members of the wire hanger 20 the same being clamped in said position by the before mentioned nuts 23.

The positive electrodes 25, of which there are two in number, are secured to the opposite sides of the porcelain block 18 by means of a bolt 26 passing therethrough with nuts 27 on either end to clamp the plates in position. The second connecting wire 28 is also suitably attached to this bolt to connect with the opposite or positive pole of the battery, which, as will be noted, is properly insulated from the negative side.

The construction shown in Fig. 4 also represents an assembled element that is adapted to be suspended from a cover by a single rod 12ª, which is connected to a bridge piece 29, to which the positive electrodes 25ª are hung. The cylindrical form of negative electrode 24ª is insulatively connected to the before mentioned bridge piece 29 through the medium of a pair of depending wires 30 that pass down through the inside of the electrode and are turned up over the lower end portions. The end portions of this cylindrical element are covered by caps 31, the flanges 32 of which are serrated to better engage the outer peripheral edge of the cylinder and the wire windings thereon contained. The connecting wires 14 and 28 may be attached to the respective poles of the two elements in the manner shown.

The feature of the invention as before stated resides in means for protecting the compressed negative electrodes, and which I form by the employment of one or more pieces of zinc coated wire 33 that are wound around and around the outer surface of the compressed electrode either vertically or crosswise and so as to encircle both the plate and its frame if preferred, as shown in Figs. 1, 2 and 4, or simply to encircle the electrode itself as shown in the other figures. These windings may obviously be arranged at a suitable distance apart to sufficiently protect the element, and yet at the same time not cover any more of the surface than is necessary, and the end portions 35 may be soldered or otherwise secured to the windings as shown in Figs. 3 and 6, or may be fastened to the frame by being wound around a part of the same as shown at 36 in Figs. 1, 2 and 4. When the plate forms of elements are wound independently as shown in Figs. 3 and 6, they may be thus supported in a frame like that shown in Fig. 1, or, for instance, like that shown in my companion application filed on even date herewith and bearing Serial No. 692,737. In either instance it will be noted that the end portions of the winding will of necessity be in firm engagement with the portion of the frame or hanger arranged adjacent thereto. The wire windings will obviously be disposed across the face of the electrodes and thus in positive engagement therewith.

The wire proper may be ordinarily iron wire, though, as before stated, is plated with zinc, which in practice and immediately upon being submerged in the battery solution, serves to produce a local action between the wire and copper oxid, which serves to treat and reduce the surface of the latter. This action produces a red coloring of the black copper, which first appears beneath and alongside of the wire, and gradually extends across the surface from one wire to the other. This preliminary reduction of the negative plates better serves to produce a fuller throw of electricity at the beginning of the operation of the battery. The form of the wire is preferably round, and therefore while a firm engagement of the plate is had the construction is such as to permit the solution to attack the entire surface of the plate.

In the drawing shown in Fig. 5, it will be noted that the cylindrical element therein illustrated is protected by a covering of wire both upon the outside and inside, the latter being indicated by 37. This protector would be formed of spring wire and in practice is first wound upon a mandrel of proper size and shape and then placed in the cylinder and allowed to expand against the inner walls thereof, the ends can be fastened or not as desired. The supporting wires 30 having a supporting hook 30ª formed on their lower end portions are then threaded through the end caps 31 and thus placed in position against the inside windings in a way to insure an engagement with each as shown in the drawings and in a manner to further support and hold the several members in position.

Having thus described my invention, what I claim and desire to secure by Letters Patent is:—

1. In a primary battery the combination with a compressed oxid of copper electrode, of one or more pieces of wire continuously wound around the said compressed electrode.

2. In a primary battery the combination of a compressed oxid of copper electrode, a frame or hanger for supporting the same, and one or more pieces of wire continuously wound around both said electrode and frame.

3. In a primary battery the combination with a compressed oxid of copper negative electrode, a frame or hanger for supporting the same, a continuous piece of wire wound against the opposite sides of the compressed oxid of copper electrode.

4. In a primary battery the combination with a compressed copper oxid electrode, of one or more pieces of wire wound against the two sides of the electrode.

5. The combination with a compressed oxid of copper negative electrode, of a wire wound horizontally and continuously around the electrode to form a series of supports for the face of the electrode.

6. The combination with a compressed oxid of copper plate for a primary battery, of one or more pieces of wire wound entirely and continuously around and across the face of the plate to form a series of parallel supports for the plate.

7. The combination with a compressed oxid of copper negative electrode, of a continuous piece of wire arranged in spaced horizontal lines across the faces of the electrode.

8. The combination of a compressed oxid of copper negative electrode, a frame or hanger for supporting the same, and a continuous piece of wire wound around the electrode to form a series of parallel supports and having its end portions secured to the said frame.

Signed at Bridgeport in the county of Fairfield and State of Connecticut this 22nd day of April A. D., 1912.

CHARLES B. SCHOENMEHL.

Witnesses:
C. M. NEWMAN,
RUTH M. WORDEN.